United States Patent
Chen et al.

(10) Patent No.: US 11,126,267 B2
(45) Date of Patent: Sep. 21, 2021

(54) TACTILE FEEDBACK DEVICE AND OPERATION METHOD THEREOF

(71) Applicant: GIANTPLUS TECHNOLOGY CO., LTD, Miaoli County (TW)

(72) Inventors: Hung-Li Chen, Tainan (TW); Yi-Hsuan Hsiang, Taoyuan (TW); Hsin-Yu Han, Taoyuan (TW); Chih-Teng Huang, Taoyuan (TW)

(73) Assignee: GIANTPLUS TECHNOLOGY CO., LTD, Miaoli County (TW)

( * ) Notice: Subject to any disclaimer, the term of this patent is extended or adjusted under 35 U.S.C. 154(b) by 0 days.

(21) Appl. No.: 16/916,176

(22) Filed: Jun. 30, 2020

(65) Prior Publication Data

US 2021/0191516 A1 Jun. 24, 2021

Related U.S. Application Data

(60) Provisional application No. 62/950,114, filed on Dec. 19, 2019.

(30) Foreign Application Priority Data

Jun. 1, 2020 (TW) .................................. 109118243

(51) Int. Cl.
*G06F 3/01* (2006.01)
*H04W 4/38* (2018.01)
*G06T 7/20* (2017.01)

(52) U.S. Cl.
CPC .............. *G06F 3/016* (2013.01); *G06F 3/014* (2013.01); *G06F 3/017* (2013.01); *G06T 7/20* (2013.01); *H04W 4/38* (2018.02)

(58) Field of Classification Search
CPC .......... G06F 3/016; G06F 3/014; G06F 3/017; G06T 7/20
See application file for complete search history.

(56) References Cited

U.S. PATENT DOCUMENTS 9,086,732 B2 7/2015 Gagner et al.
9,104,271 B1 * 8/2015 Adams .................... G06F 3/014
(Continued)

FOREIGN PATENT DOCUMENTS

CN 103513764 1/2014
CN 109634402 4/2019
(Continued)

OTHER PUBLICATIONS

"Office Action of Taiwan Counterpart Application", dated Jun. 8, 2021, p. 1-p. 7.

*Primary Examiner* — David E Choi
(74) *Attorney, Agent, or Firm* — JCIPRNET

(57) ABSTRACT

A tactile feedback device including a wearable device and a host is provided. The wearable device includes an acceleration sensor and an electrical stimulation generator. The acceleration sensor detects a movement state of a target object to obtain acceleration data. The electrical stimulation generator generates and transmits electrical stimulation to the target object according to a tactile control signal. The host includes a calculation circuit for calculating a displacement amount of the target object with respect to the host according to a signal attenuation amount of a radio wave signal and performing a calculation operation according to the displacement amount and the acceleration data to generate movement track information indicating a movement of the target object. The calculation circuit compares the movement track information with an object position in a display image to generate the tactile control signal. An operation method of the tactile feedback device is also provided.

17 Claims, 4 Drawing Sheets

(56) References Cited

U.S. PATENT DOCUMENTS

| | | | |
|---|---|---|---|
| 9,257,022 B2* | 2/2016 | Cruz-Hernandez | G08B 6/00 |
| 9,576,445 B2* | 2/2017 | Cruz-Hernandez | G08B 6/00 |
| 2002/0044132 A1 | 4/2002 | Fish | |
| 2015/0309582 A1* | 10/2015 | Gupta | G06F 3/017 |
| | | | 345/156 |
| 2017/0212589 A1 | 7/2017 | Domenikos et al. | |
| 2017/0255254 A1 | 9/2017 | Huang | |
| 2018/0033262 A1* | 2/2018 | Shah | G06F 3/016 |
| 2018/0348866 A1 | 12/2018 | Alanis et al. | |
| 2019/0017813 A1 | 1/2019 | Holz | |
| 2019/0018141 A1 | 1/2019 | Holz | |
| 2019/0384393 A1* | 12/2019 | Cruz-Hernandez | G06F 3/016 |
| 2020/0045527 A1* | 2/2020 | Fong | G06F 3/0488 |
| 2020/0205707 A1* | 7/2020 | Sanyal | A61B 5/1032 |

FOREIGN PATENT DOCUMENTS

| | | |
|---|---|---|
| CN | 109840022 | 6/2019 |
| CN | 110036579 | 7/2019 |
| JP | 2006163886 | 6/2006 |
| KR | 1020170002916 | 1/2017 |
| TW | 201502859 | 1/2015 |
| TW | 201633104 | 9/2016 |
| TW | 201802650 | 1/2018 |
| TW | 1672168 | 9/2019 |

* cited by examiner

TACTILE FEEDBACK DEVICE AND OPERATION METHOD THEREOF

CROSS-REFERENCE TO RELATED APPLICATION

This application claims the priority benefits of U.S. provisional application Ser. No. 62/950,114, filed on Dec. 19, 2019, and Taiwan application Ser. No. 109118243, filed on Jun. 1, 2020. The entirety of each of the above-mentioned patent applications is hereby incorporated by reference herein and made a part of this specification.

BACKGROUND

Technical Field

The invention relates to a tactile feedback device and an operation method thereof, and particularly relates to a tactile feedback device with a simplified tactile feedback mechanism and a lightweight overall device and an operation method thereof.

Description of Related Art

Human-computer interaction (HCI) technique is to establish an interaction relationship between a machine, a computer system and a user by providing sensory experiences including vision, hearing, smell and touch. Among them, the most popular and focused effort is on development of vision systems, such as head-mounted displays (HMD) and naked-eye 3D displays, which may obtain a realistic stereoscopic image with a sense of space and depth through a deceptive visual technique. The experiences of hearing and smell are mostly achieved by external devices that have been implemented for a long time, and the difficulty of implementation thereof is relatively low. Comparatively, a development time of tactile somatosensory devices is long and input cost thereof is high. Therefore, the tactile somatosensory devices often have fewer breakthroughs and are difficult to be popularized due to expensive equipment cost, complicated tactile mechanisms, and overly bulky devices. Therefore, there is a need for a tactile feedback device and an operation method thereof that simultaneously take input cost, a simplified tactile feedback mechanism, and device portability into consideration.

SUMMARY

The invention is directed to a tactile feedback device and an operation method thereof, which are adapted to solve the defects of expensive equipment cost, complicated tactile mechanism, and overly bulky device of the related art.

The invention provides a tactile feedback device including a wearable device, a distance sensor, a display and a host. The wearable device is adapted to be worn on a target object, and includes an acceleration sensor and at least one electrical stimulation generator. The acceleration sensor is configured to detect a movement state of the target object to obtain acceleration data. The at least one electrical stimulation generator is configured to generate corresponding electrical stimulation and transmit the electrical stimulation to the target object according to a tactile control signal. The distance sensor is configured to send a radio wave signal to the target object, and receive a corresponding echo signal, and the distance sensor generates a signal attenuation amount according to the echo signal. The display is configured to display a display image according to image information. The host is coupled to the wearable device, the distance sensor and the display, and includes a calculation circuit. The calculation circuit is configured to calculate a displacement amount of the target object with respect to the distance sensor according to the signal attenuation amount of the radio wave signal caused by a distance between the distance sensor and the target object. The calculation circuit further performs a calculation operation according to the displacement amount and the acceleration data to generate movement track information indicating a movement of the target object. Moreover, the calculation circuit compares the movement track information with an object position in the display image to generate the tactile control signal.

The invention provides an operation method of a tactile feedback device, wherein the tactile feedback device includes a wearable device adapted to be worn on a target object, a distance sensor and a host. The operation method includes following steps. A movement state of the target object is detected by the wearable device to obtain acceleration data. A radio wave signal is sent to the target object and a corresponding echo signal is received by the distance sensor, and a signal attenuation amount is generated by the distance sensor according to the echo signal. A displacement amount of the target object with respect to the distance sensor is calculated by the host according to the signal attenuation amount of the radio wave signal caused by a distance between the distance sensor and the target object. A calculation operation is performed by the host based on the displacement amount and the acceleration data to generate movement track information indicating a movement of the target object. The movement track information is compared with an object position in a display image by the host to generate a tactile control signal. Corresponding electrical stimulation is generated by the wearable device according to the tactile control signal, and the electrical stimulation is transmitted to the target object.

Based on the above description, in the invention, the displacement amount of the target object is deduced according to the signal attenuation amount of the radio wave signal, and the movement track information of the target object is calculated according to the displacement amount and the acceleration data of the target object. By comparing the movement track information of the target object with a position of a virtual object in the display image, the tactile control signal is generated to serve as a basis for the electrical stimulation generator to provide electrical stimulation. Therefore, compared to the related art, the invention has advantages of lower input cost, simplified tactile feedback mechanism, and lightweight of the tactile feedback device, etc.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
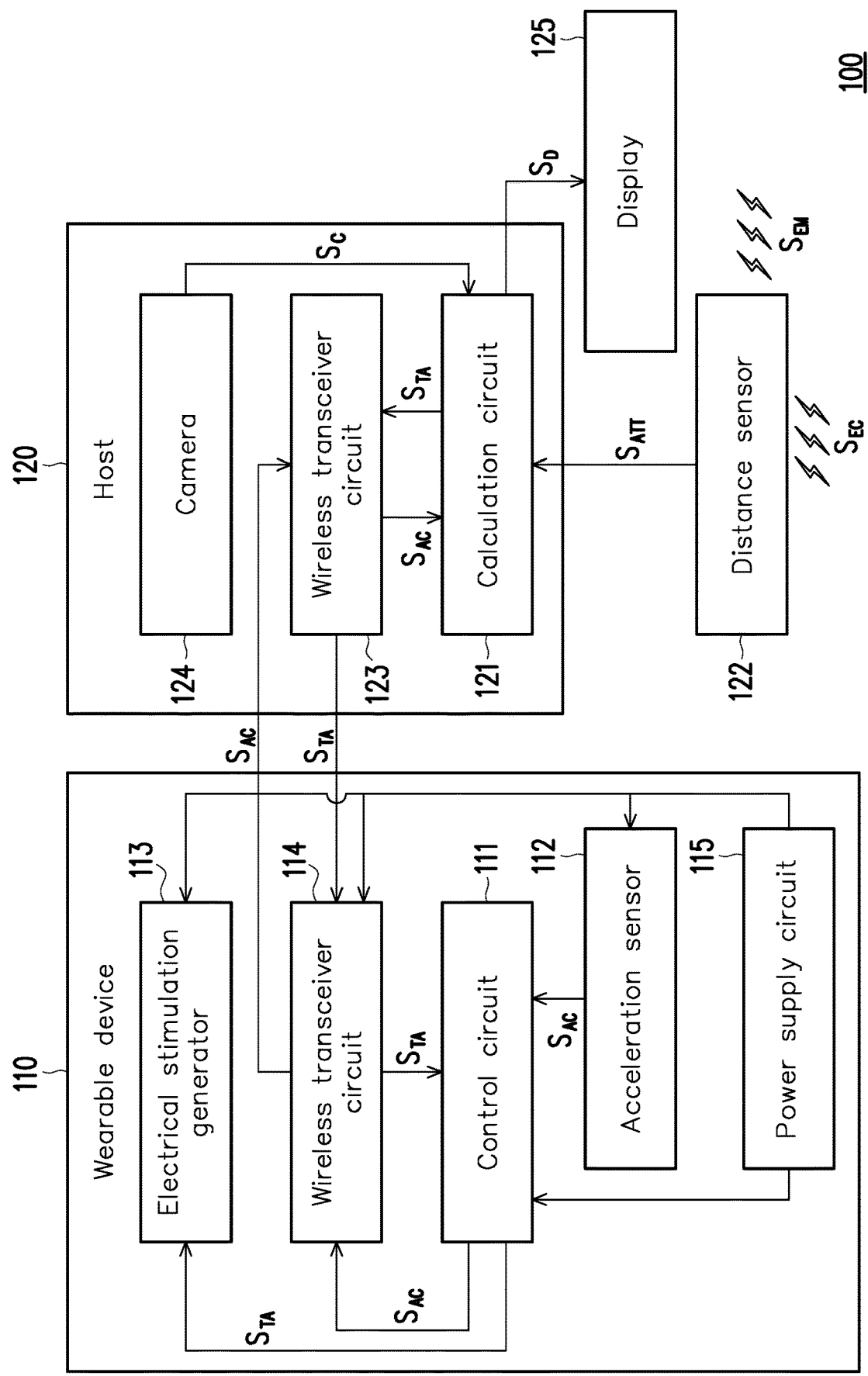
FIG. 1 is a block schematic diagram of a tactile feedback device according to an embodiment of the invention.

FIG. 1 is a block schematic diagram of a tactile feedback device according to an embodiment of the invention. Referring to FIG. 1, a tactile feedback device 100 includes a wearable device 110 and a host 120 coupled to each other in a wireless manner. The wearable device 110 is adapted to be worn on a target object. The target object may be a person or a part of a human body, such as a head, a hand, a trunk or a foot. In the embodiment, the wearable device 110 may be implemented in the form of a glove. However, the invention is not limited to the implementation of the glove. In other embodiments, the wearable device 110 may also be implemented by a headgear, or a piece of clothing such as a waistcoat or an upper garment, etc. In other embodiments, the wearable device 110 may also be coupled to the host 120 in a wired manner.

The wearable device 110 mainly includes an acceleration sensor 112 and an electrical stimulation generator 113. In the embodiment, the wearable device 110 further includes a wireless transceiver circuit 114, a control circuit 111, and a power supply circuit 115. The acceleration sensor 112 is configured to detect a movement state of the target object to obtain acceleration data SAC. The acceleration data SAC may include a linear displacement amount, linear acceleration data, and angular acceleration data. The acceleration sensor 112 may be implemented by any one or a combination of an accelerometer, a gyroscope, a linear accelerometer, and an inertial measurement unit (IMU). The accelerometer may measure a direction and a magnitude of the acceleration by detecting an electric quantity shift of a MEMS capacitor on a chip, or by detecting an optical path deviation. In other embodiments, other types of accelerometers may also be adopted, which is not limited by the invention. The control circuit 111 is coupled to the acceleration sensor 112 to receive the acceleration data SAC and transmit the acceleration data SAC to the host 120 through the wireless transceiver circuit 114 in a wireless manner.

The host 120 mainly includes a calculation circuit 121 and a wireless transceiver circuit 123. In the embodiment, the host 120 may be a computer, a laptop computer, a tablet computer, or other electronic devices with computing capability. The calculation circuit 121 receives the acceleration data SAC through the wireless transceiver circuit 123, and performs a calculation operation according to the acceleration data SAC and a displacement amount to generate movement track information indicating a movement of the target object. The calculation circuit 121 compares the movement track information with a virtual position of a virtual object to generate a tactile control signal $S_{TA}$. The displacement amount is calculated based on a signal attenuation amount $S_{ATT}$ of a radio wave signal $S_{EC}$, which represents a position changing amount of the target object with respect to the distance sensor 122, where the signal attenuation amount $S_{ATT}$ is related to a signal strength difference between the radio wave signal $S_{EC}$ and an echo signal $S_{EM}$.

To be specific, the distance sensor 122 and a display 125 may be disposed near the host 120. The distance sensor 122 and the display 125 are coupled to the host 120. More specifically, the distance sensor 122 and the display 125 are coupled to the calculation circuit 121 of the host 120. The distance sensor 122 is configured to transmit the radio wave signal $S_{EC}$ to the target object and receive the corresponding echo signal $S_{EM}$. The distance sensor 122 may calculate the signal attenuation amount $S_{ATT}$ of the radio wave signal $S_{EC}$ according to the radio wave signal $S_{EC}$ and the corresponding echo signal $S_{EM}$. The signal attenuation amount $S_{ATT}$ may be obtained based on a power loss amount of the echo signal $S_{EM}$ compared to the radio wave signal $S_{EC}$. Moreover, the signal attenuation amount $S_{ATT}$ is positively related to a distance between the distance sensor 122 and the target object. In the embodiment, the power loss amount may be calculated according to a following equation (1), where Lbf represents the power loss amount, and f represents an emission frequency (with a unit of Hz) of the radio wave signal $S_{EC}$. Through the equation (1), a displacement amount d may be obtained according to the power loss amount Lbf and the emission frequency f of the radio wave signal $S_{EC}$. In another embodiment, the displacement amount may be calculated based on an attenuation amount of a peak value of the echo signal $S_{EM}$ compared to the radio wave signal $S_{EC}$.

$$Lbf = -147.6 + 20*\log(f) + 20*\log(d) \qquad \text{equation (1)}$$

In the embodiment, the distance sensor 122 calculates the signal attenuation amount $S_{ATT}$ according to the radio wave signal $S_{EC}$ and the corresponding echo signal $S_{EM}$, but the invention is not limited thereto.

Regarding a setting position of the distance sensor 122, in the embodiment, the distance sensor 122 is disposed near the host 120 and is independent to the host 120, and a number of sensors included in the distance sensor 122 is at least there, so as to locate a position of the target object more accurately by means of triangular positioning. In another embodiment, the distance sensor 122 may be disposed inside the host 120 or outside the host 120, for example, disposed at a periphery of the display 125. Alternatively, in other embodiments, the distance sensor 122 may be disposed on the wearable device 110 to transmit a radio wave signal $S_{EC}$ to the host 120 and receive an echo signal $S_{EM}$. The distance sensor 122 may determine the displacement amount of the target object relative to the distance sensor 122 according to a signal attenuation $S_{ATT}$ amount of the echo signal $S_{EM}$ relative to the radio wave signal $S_{EC}$.

In conclusion, the calculation circuit 121 of the embodiment may receive the signal attenuation amount $S_{ATT}$ and calculate the displacement amount according to the signal attenuation amount $S_{ATT}$. After calculating the displacement amount, the calculation circuit 121 imports the acceleration data SAC transmitted from the wearable device 110 to obtain the movement track information of the target object, for example, a posture signal of a movement such as flipping and moving, so as to generate the tactile control signal $S_{TA}$.

Figure 2:
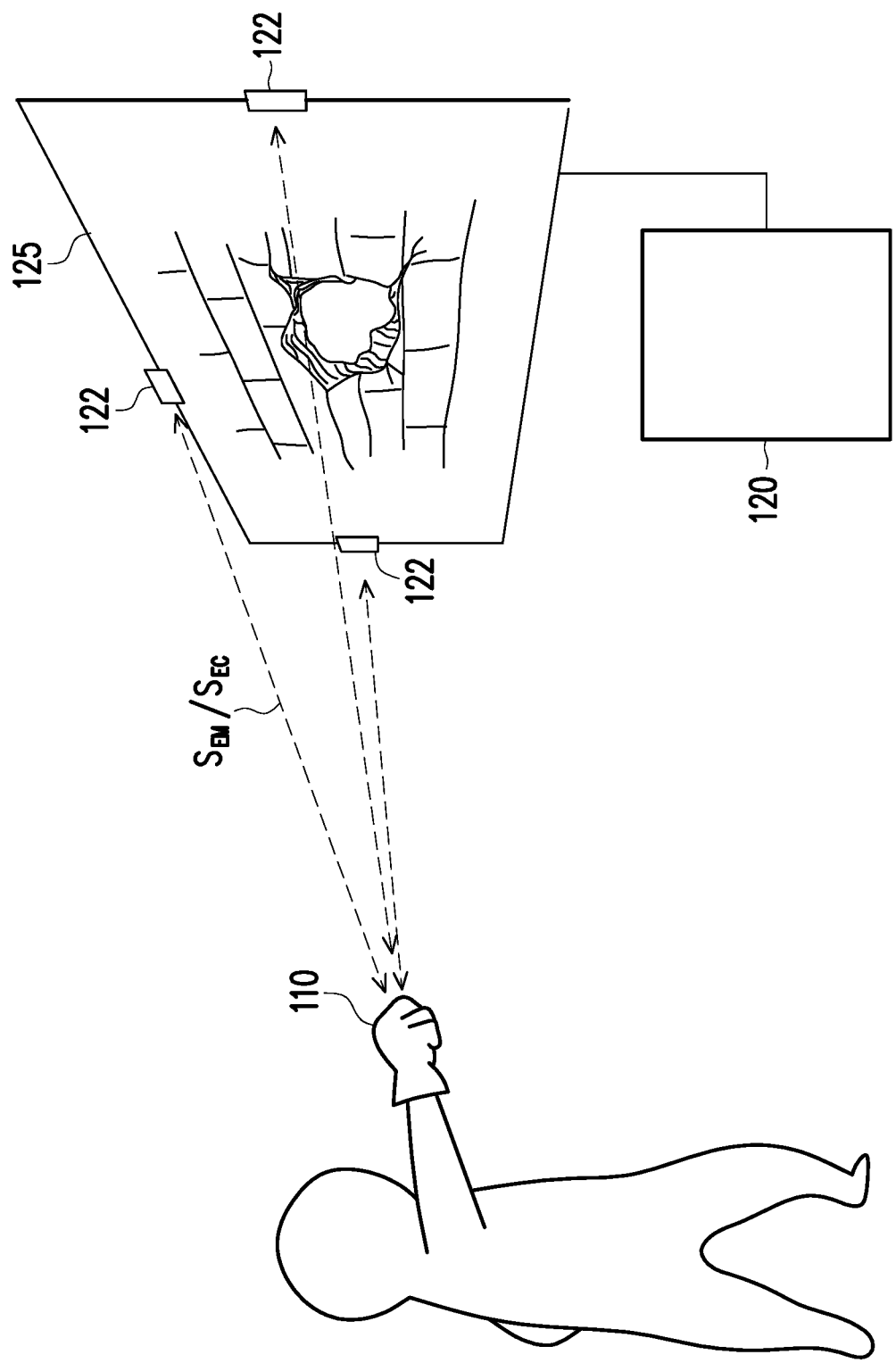
FIG. 2 is an operational schematic diagram of a tactile feedback device according to an embodiment of the invention.

FIG. 2 is an operational schematic diagram of a tactile feedback device according to an embodiment of the invention. The acceleration sensor (not shown) of the wearable device 110 may include a plurality of sensors distributed on finger knuckles, a palm, and a hand back. Referring to FIG. 2, when the user makes a punching movement, the distance sensor 122 may detect that a distance between the hand and the distance sensor 122 is shortened (i.e., the displacement amount becomes smaller). The acceleration sensor of the wearable device 110 may detect linear displacement data and linear acceleration data of the hand. The acceleration sensor may also detect angular acceleration data caused by a movement of flipping of the palm. By synthesizing the displacement amount, the linear displacement data, the linear acceleration data and the angular acceleration data, the calculation circuit (not shown) of the host 120 may obtain gesture information indicating a punching posture.

Referring to FIG. 1 and FIG. 2, a camera 124 is coupled to the calculation circuit 121 of the host 120. In the embodiment, the camera 124 is disposed inside the host 120. The calculation circuit 121 in the host 120 may further use image information Sc of the user captured by the camera 124 as auxiliary information for judging a movement posture of the hand. For example, the calculation circuit 121 may compare the image information Sc with pre-stored sample image information to assist determining, for example, the movement posture of the hand of the user.

In another embodiment, the camera 124 may be disposed outside the host 120, for example, disposed on the display 125. A plurality of the distance sensors 122 are disposed around the display 125. The distance sensors 122 obtain a position and a displacement amount of the user relative to the display 125 by transmitting the radio wave signals $S_{EC}$ and receiving the echo signals $S_{EM}$. Based on the displacement amount of the hand, the gesture information, and a virtual position of a virtual object displayed on the display 125 (for example, a position of a wall shown in FIG. 2), the calculation circuit in the host 120 may determine an interaction relationship between the hand and the wall. The calculation circuit accordingly generates the tactile control signal $S_{TA}$ and determines whether to change a content of image information SD to change a display image displayed by the display 125 (for example, to change from displaying a complete wall to displaying a broken wall) according to the movement track information of the target object.

Referring back to FIG. 1, the tactile control signal $S_{TA}$ is sent to the wireless transceiver circuit 114 of the wearable device 110 through the wireless transceiver circuit 123 of the host 120. The control circuit 111 of the wearable device 110 receives the tactile control signal $S_{TA}$ through the wireless transceiver circuit 114 and transmits the tactile control signal $S_{TA}$ to the corresponding electrical stimulation generator 113. The electrical stimulation generator 113 generates an electric current according to the tactile control signal $S_{TA}$. The user (the target object) senses the electric current through the skin to acquire a simulated tactile experience. The wearable device 110 of the embodiment may further include the power supply circuit 115. The power supply circuit 115 is configured to supply power to the control circuit 111, the acceleration sensor 112, the electrical stimulation generator 113, and the wireless transceiver circuit 114.

Figure 3A:
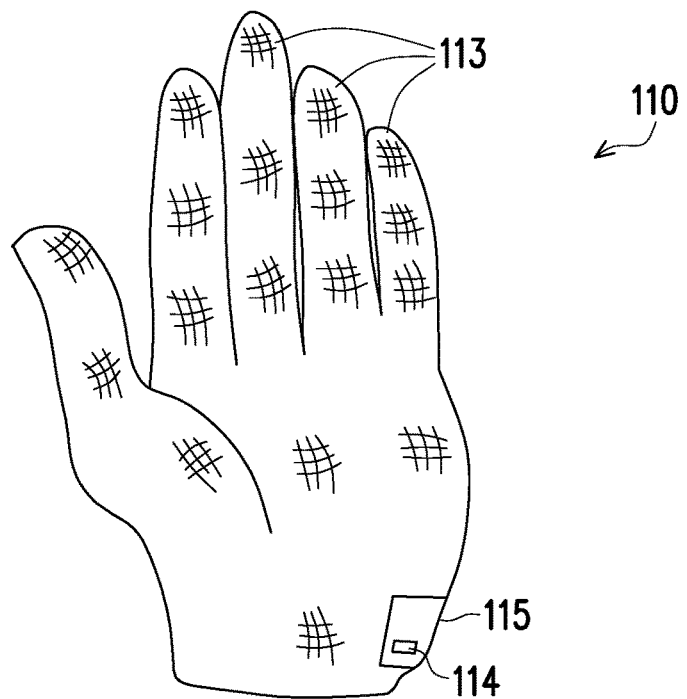
FIG. 3A is a schematic front view of a wearable device according to an embodiment of the invention.
Figure 3B:
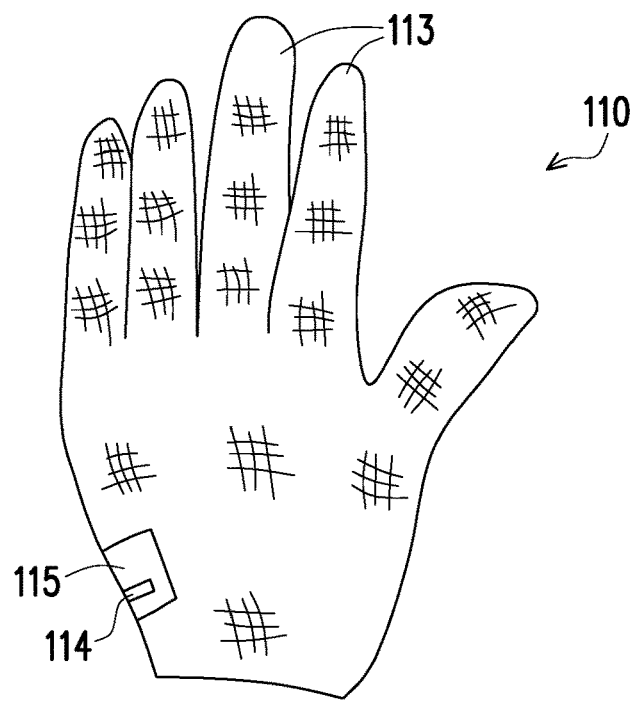
FIG. 3B is a schematic back view of the wearable device according to an embodiment of the invention.

FIG. 3A is a schematic front view of a wearable device according to an embodiment of the invention. FIG. 3B is a schematic back view of the wearable device according to an embodiment of the invention. Referring to FIG. 3A and FIG. 3B, in the embodiment, the wearable device 100 is actually a glove. The glove is configured with a plurality of electrical stimulation generators 113 at portions corresponding to the finger knuckles, the palm and the hand back. The part of the glove near the wrist is further configured with the wireless transceiver circuit 114 and the power supply circuit 115. The power supply circuit 115 is connected to each of the electrical stimulation generators 113 through wires. The wireless transceiver circuit 114 is configured to send the acceleration data detected by the acceleration sensor (not shown) to the host, and receive the tactile control signal from the host. The electrical stimulation generators 113 generate electric currents according to the corresponding tactile control signal to provide the user with a tactile experience. For example, when the user punches, the electrical stimulation felt by the hand back is greater than the electrical stimulation felt by the palm.

Figure 4:
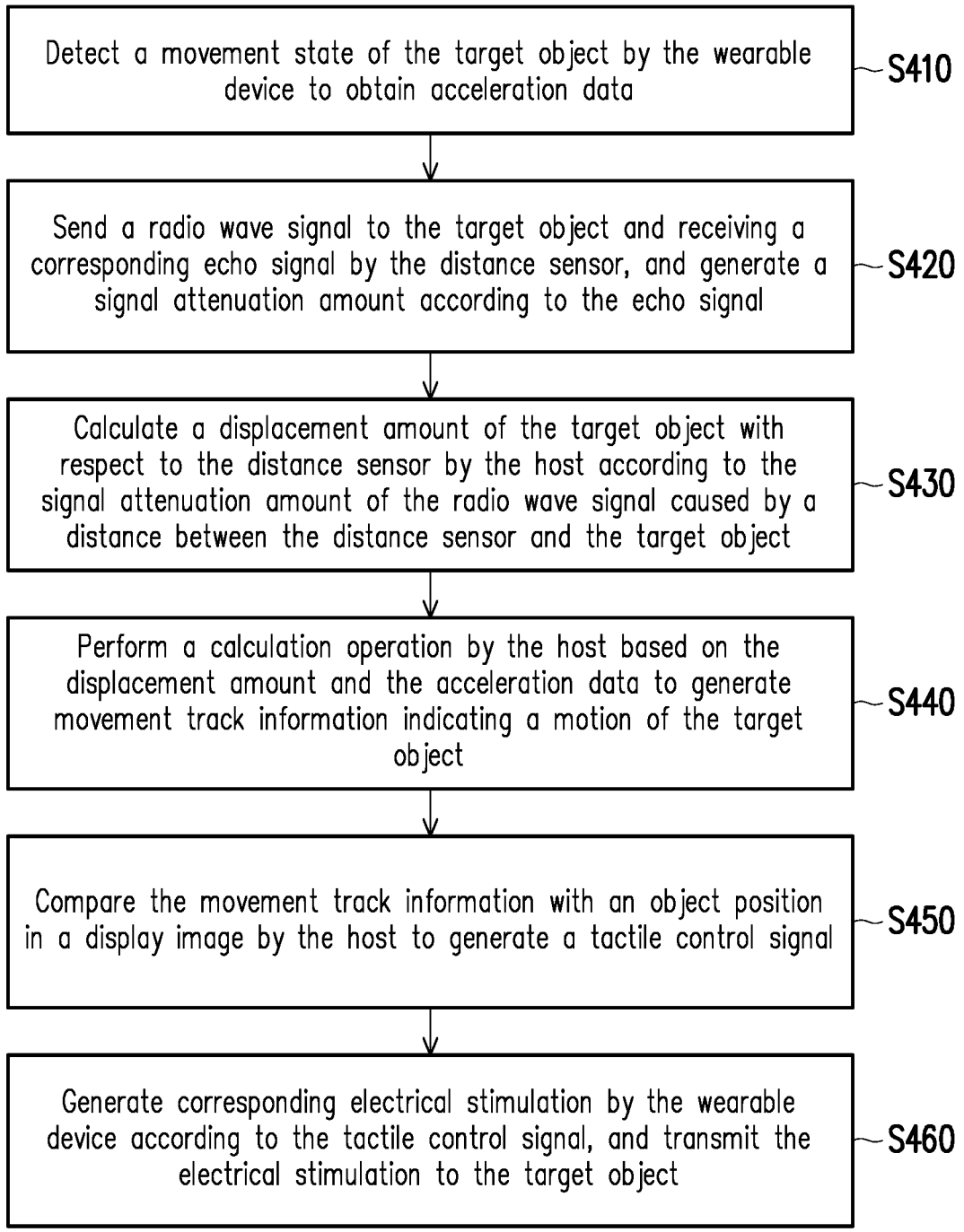
FIG. 4 is a flowchart illustrating steps of an operation method of a tactile feedback device according to an embodiment of the invention.

FIG. 4 is a flowchart illustrating steps of an operation method of a tactile feedback device according to an embodiment of the invention. Referring to FIG. 1 and FIG. 4 at the same time, in step S410, the wearable device 110 detects a movement state of the target object to obtain the acceleration data SAC. In step S420, the distance sensor 122 sends the radio wave signal $S_{EC}$ to the target object, and receives the corresponding echo signal $S_{EM}$, and the distance sensor 122 generates the signal attenuation amount $S_{ATT}$ according to the echo signal $S_{EM}$. In step S430, the host 120 calculates a displacement amount of the target object with respect to the distance sensor 122 according to the signal attenuation amount $S_{ATT}$ of the radio wave signal $S_{EC}$ caused by a distance between the distance sensor 122 and the target object. In step S440, the host 120 performs a calculation operation according to the displacement amount and the acceleration data SAC to generate movement track information indicating a movement of the target object. In step S450, the host 120 compares the movement track information with a virtual position of an object in a display image to generate the tactile control signal $S_{TA}$. In step S460, the wearable device 110 generates corresponding electrical stimulation according to the tactile control signal $S_{TA}$, and transmits the electrical stimulation to the target object to provide the target object with a tactile experience.

In summary, the tactile feedback device of the invention may deduce the displacement amount of the target object according to the signal attenuation amount of the radio wave signal, and calculate the movement track information of the target object according to the displacement amount of the target object and the acceleration data of the target object obtained through measurement. By comparing the movement track information of the target object with a position of a virtual object in the display image, the tactile feedback device may generate the tactile control signal to serve as a basis for the electrical stimulation generator to provide electrical stimulation. Therefore, compared to the related art, the invention has advantages of lower input cost, simplified tactile feedback mechanism, and lightweight of the tactile feedback device, etc.

What is claimed is:
1. A tactile feedback device, comprising:
   a wearable device, adapted to be worn on a target object, comprising:
      an acceleration sensor, configured to detect a movement state of the target object to obtain acceleration data; and
      at least one electrical stimulation generator, configured to generate corresponding electrical stimulation and transmit the electrical stimulation to the target object according to a tactile control signal;
   a distance sensor, configured to send a radio wave signal to the target object and receive a corresponding echo signal, and the distance sensor generating a signal attenuation amount according to the echo signal;
   a display, configured to display a display image according to image information; and
   a host, coupled to the wearable device, the distance sensor, and the display, comprising:
      a calculation circuit, configured to:
         calculate a displacement amount of the target object with respect to the distance sensor according to the signal attenuation amount of the radio wave signal caused by a distance between the distance sensor and the target object;

perform a calculation operation according to the displacement amount and the acceleration data to generate movement track information indicating a movement of the target object; and compare the movement track information with an object position in the display image to generate the tactile control signal.

2. The tactile feedback device as claimed in claim 1, wherein the acceleration sensor is further configured to detect an angular acceleration and a linear acceleration of the target object to obtain the acceleration data.

3. The tactile feedback device as claimed in claim 1, wherein the calculation circuit is further configured to change the image information according to the movement track information.

4. The tactile feedback device as claimed in claim 1, further comprising: a camera, configured to photograph the target object to obtain an image, wherein the calculation circuit is further configured to determine a movement posture of the target object according to the image, the acceleration data, and the displacement amount.

5. The tactile feedback device as claimed in claim 1, wherein the wearable device further comprises a control circuit, coupled to the acceleration sensor and configured to control the acceleration data to be transmitted to the host, and the control circuit controls the tactile control signal to be transmitted to the at least one electrical stimulation generator.

6. The tactile feedback device as claimed in claim 1, wherein the wearable device is a glove, and the glove is distributed with a plurality of electrical stimulation generators.

7. The tactile feedback device as claimed in claim 1, wherein the wearable device further comprises a power supply circuit, configured to supply power to the acceleration sensor and the at least one electrical stimulation generator.

8. The tactile feedback device as claimed in claim 1, wherein the wearable device is wirelessly coupled to the host.

9. The tactile feedback device as claimed in claim 8, wherein the wearable device further comprises a first wireless transceiver circuit, configured to send the acceleration data and receive the tactile control signal, and the host further comprises a second wireless transceiver circuit, configured to receive the acceleration data and send the tactile control signal.

10. An operation method of a tactile feedback device, wherein the tactile feedback device comprises a wearable device adapted to be worn on a target object, a distance sensor, and a host, the operation method comprising:

detecting a movement state of the target object by the wearable device to obtain acceleration data;

sending a radio wave signal to the target object and receiving a corresponding echo signal by the distance sensor, and generating a signal attenuation amount by the distance sensor according to the echo signal;

calculating a displacement amount of the target object with respect to the distance sensor by the host according to the signal attenuation amount of the radio wave signal caused by a distance between the distance sensor and the target object;

performing a calculation operation by the host according to the displacement amount and the acceleration data to generate movement track information indicating a movement of the target object;

comparing the movement track information with an object position in a display image by the host to generate a tactile control signal; and generating corresponding electrical stimulation by the wearable device according to the tactile control signal, and transmitting the electrical stimulation to the target object.

11. The operation method of the tactile feedback device as claimed in claim 10, further comprising:

generating the signal attenuation amount by the host according to a signal strength difference between the radio wave signal and the echo signal.

12. The operation method of the tactile feedback device as claimed in claim 10, wherein the acceleration data comprises an angular acceleration and a linear acceleration of the target object.

13. The operation method of the tactile feedback device as claimed in claim 10, wherein the tactile feedback device further comprises a display, the operation method further comprising:

displaying the display image by the display according to image information, and changing the image information by a calculation circuit according to the movement track information.

14. The operation method of the tactile feedback device as claimed in claim 10, wherein the tactile feedback device further comprises a camera, the operation method further comprising:

photographing the target object by the camera to obtain an image, and determining a movement posture of the target object by the host according to the image, the acceleration data, and the displacement amount.

15. The operation method of the tactile feedback device as claimed in claim 10, wherein the wearable device further comprises a control circuit, the operation method further comprising:

controlling the acceleration data to be transmitted to the host by the control circuit, and controlling the tactile control signal to be configured to generate the electrical stimulation by the control circuit.

16. The operation method of the tactile feedback device as claimed in claim 10, wherein the wearable device is a glove, and the glove is distributed with a plurality of electrical stimulation generators to generate the electrical stimulation according to the tactile control signal.

17. The operation method of the tactile feedback device as claimed in claim 10, further comprising:

supplying power by the wearable device to detect the movement state of the target object and generate the electrical stimulation.

* * * * *